United States Patent [19]

Holik et al.

[11] 4,051,092

[45] Sept. 27, 1977

[54] FOUNDRY CORE COMPOSITION OF AGGREGATE AND A BINDER THEREFOR

[75] Inventors: Melville J. Holik, Franklin Park; John F. Kraemer, Chicago, both of Ill.

[73] Assignee: International Minerals & Chemical Corporation, Libertyville, Ill.

[21] Appl. No.: 733,721

[22] Filed: Oct. 26, 1976

Related U.S. Application Data

[63] Continuation-in-part of Ser. No. 631,583, Nov. 15, 1975, abandoned.

[51] Int. Cl.$^2$ .............................................. C08L 61/10
[52] U.S. Cl. .............................. 260/29.3; 260/22 TN; 260/32.8 R; 260/32.8 EP
[58] Field of Search ................ 260/29.3, 38, DIG. 40, 260/32.8 R, 32.8 EP, 33.2 R, 33.2 EP, 22 TN, 29.2 TN, 29.2 E, 29.2 EP; 164/43

[56] References Cited

U.S. PATENT DOCUMENTS

| 3,268,467 | 8/1966 | Rye et al. ............................ 260/29.3 |
| 3,409,579 | 11/1968 | Robins ............................ 260/30.4 R |
| 3,428,110 | 2/1969 | Walker et al. ......................... 164/43 |
| 3,702,316 | 11/1972 | Robins et al. .......................... 260/38 |
| 3,904,559 | 9/1975 | Furness ............................. 260/38 X |
| 3,905,934 | 9/1975 | Gardikes ........................... 260/38 X |

*Primary Examiner*—Theodore E. Pertilla
*Attorney, Agent, or Firm*—Robert H. Dewey; Howard E. Post

[57] ABSTRACT

A new foundry core composition comprises foundry aggregate, a resin base such as an aqueous resole resin, a polyisocyanate, and a selected solvent therefor. The solvent is an acetal or ketal such as butyl acetal. The compositions are suitable for use in cold box, no-bake, and rapid no-bake processes.

8 Claims, No Drawings

FOUNDRY CORE COMPOSITION OF AGGREGATE AND A BINDER THEREFOR

CROSS-REFERENCE TO RELATED APPLICATIONS

This application is a continuation-in-part of Ser. No. 631,583, filed No. 15, 1975 and now abandoned.

BACKGROUND OF THE INVENTION

This invention relates to an improved foundry core mix. In a more particular aspect, this invention relates to components of an improved core binder system.

Cores useful in making metal castings are customarily made by placing a foundry aggregate, usually silica sand which has been admixed with a suitable binder, against a shape or pattern and then hardening the binder, as by polymerization. The resulting core is a self-supporting structure which forms a part of a mold assembly.

Various sands are used for making cores. The cores themselves are made by a variety of processes employing a wide variety of binders. Three of the many processes in commercial use today are the so-called cold box process, nobake process and the rapid no-bake process. The cold box process is one in which sand is admixed with a suitable resinous binder composition, blown into a core box, and then gassed with a suitable vapor phase catalyst to cure the binder. By such process, which is described for example in U.S. Pat. No. 3,409,579, a core of sufficient hardness to be stripped from the core box is produced in a matter of seconds. The no-bake process is one in which a resinous core binder is admixed with a catalyst and sand and placed in a core box. The core cures at ambient temperatures but much more slowly than in the cold box process, over a period of hours or even days. After a suitable period of time, such as two hours, the core can generally be stripped from the core box, but requires further cure time. The rapid no-bake process is similar to the no-bake process, but the character of the resin and the amount and type of catalyst employed are such that a core is formed and may be stripped from the core box in a matter of a few minutes. The bench life, or time period during which a sand-resin mixture may be kept before the reaction proceeds to a detrimental extent prior to placing the mixture into the core box, generally decreases rapidly when the catalyst and resin are adjusted to provide very rapid set times. Therefore the development of the rapid no-bake process was dependent upon the availability of foundry machines which were capable of mixing small but accurately controlled amounts of resin, catalyst and sand and transferring the admixture substantially immediately into a core box. Processes of this type are described, for example, in U.S. Pat. No. 3,702,316.

The subject invention provides a binder system which is suitable for use in all three of these processes by adding a suitable catalyst immediately before use. It will be understood that the kind and amount of catalyst employed will be such as to adapt the final binder-sand admixture to the intended purpose. That is, in the cold box process, the catalyst will typically be a gaseous amine, such as triethylamine, dispersed in a suitable carrier such as carbon dioxide. In the no-bake and rapid no-bake process, amine catalysts and conventional metal catalysts such as lead naphthenate or dibutyl tin dilaurate are employed in amounts adjusted to provide the desired set time.

DESCRIPTION OF THE INVENTION

It is an object of this invention to provide an improved foundry core mix.

It is another object of this invention to provide components of an improved core binder system.

Other objects will be apparent to those skilled in the art from the description herein.

Briefly, a foundry mix of this invention comprises foundry aggregate and about 1% to 5%, based upon the weight of the aggregate of a binder capable of being cured by a catalyst comprising:

a. A curable resin of the group consisting of epoxy resins, polyester resins, alkyd resins, and aqueous phenol-formaldehyde resole resins, b. A liquid polyisocyanate reactive with the resin in the amount of about 80% to 125% by weight of the resin, and c. A solvent of the formula

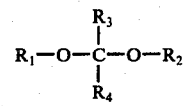

in which $R_1$ and $R_2$ are the same or different hydrocarbon radicals of three to six carbon atoms and $R_3$ and $R_4$ are the same or different hydrogen, methyl, ethyl or phenyl radicals. The solvent is present in the amount of about 10% to 40% by weight of the binder.

Surprisingly, a core prepared in the presence of the solvent of the above formula possessed a far higher tensile strength — about twice as high — as did a core prepared in the presence of a conventional aromatic solvent.

The binder composition is conventionally provided in two components or packages. One contains the resin base, the other the isocyanate. In a preferred embodiment of the invention, both the isocyanate and the resin will be dissolved or dispersed in the selected solvent. However, since few resins form stable solutions with the selected solvent, it is in general necessary to use conventional organic solvents with the resin component to provide stability. The amount and type of solvent in each package may vary provided the amount of selected solvent present in the resin-isocyanate mixture is within the limits specified. Preferred are binder compositions in which the selected solvent is present in the amount of about 23% by weight of the binder. It is generally preferred that the selected solvent be present in the amount of 10% to 40% by weight of each component (where compatible), resin base and polyisocyanate, and especially about 23% by weight of each component. In many cases the resin component will not be compatible with the selected solvent, and it is then preferred to employ the selected solvent in the amount of about 35% by weight of the polyisocyanate component. The least practical quantity of other solvent, such as isophorone, will then be used with the resin base, consistent, of course, with practical viscosity requirements.

Various resin base material heretofore known to be reactive with polyisocyanates to provide a foundry core binder may be employed in accordance with this invention. Such resin bases include epoxy resins, polyester resins, alkyd resins, and phenol-formaldehyde resins. The use of such materials in foundry processes is described in U.S. Pat. No. 3,428,110, which is incorporated herein by reference thereto.

Especially useful are aqueous phenol-formaldehyde resoles, by which is meant resoles containing more than 2% and generally up to about 25% by weight of water.

Conventional solvents which may be used to thin the resin base to provide a resin component are those solvents conventionally used in foundry core processes such as aromatic solvents, isophorone, cyclohexanone, and 2-(2-butoxy-ethoxy) ethyl acetate.

The polyisocyanates which can be used in accordance with this invention are those known to be useful in the preparation of foundry core binders. Such polyisocyanates, which will hereinafter be called reactive polyisocyanates, include the aliphatic polyisocyanates such as hexamethylene diisocyanate, alicyclic polyisocyanates such as 4,4-dicyclohexylmethane diisocyanate and aromatic polyisocyanates such as 3,4- and 2,6-toluene diisocyanate, diphenylmethyl diisocyanate, and the dimethyl derivatives thereof. Other suitable polyisocyanates are 1,5-naphthalene diisocyanate, triphenylmethane triisocyante, xylylene diisocyanate, and the methyl derivatives thereof, polymethylenepolyphenol isocyanates, and chlorophenylene-2,4-diisocyanate. Preferred, however, is the use of commercially availabe compositions which contain diphenylmethane diisocyanate, and triphenylmethane triisocyanate.

The selected solvents used in accordance with the invention are compounds of the formula

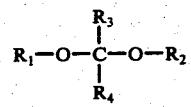

in which $R_1$ and $R_2$ are the same or different hydrocarbon radicals of three to six carbon atoms, and $R_3$ and $R_4$ are the same or different methyl, ethyl, phenyl or hydrogen radicals. Preferred are compounds in which $R_3$ and $R_4$ are hydrogen. Especially preferred is di-butoxymethane. Useful solvents are dipropoxymethane, diisobutoxymethane, dipentyloxymethane, dihexyloxymethane, and dicyclohexyloxymethane. Other solvents which may be used include n-butoxyisopropoxymethane, isobutoxybutoxymethane and isopropoxypenthyloxymethane. Among the useful solvents in which $R_3$ or $R_4$ are other than hydrogen are acetaldehyde n-propyl acetal, benzaldehyde n-butyl acetal, acetaldehyde n-butyl acetal, acetone di-n-butyl ketal, and acetophenone dipropyl ketal.

Both the base resin and the polyisocyanate are preferably admixed with the same selected solvent in those cases where the resin and selected solvent are compatible to form a stable solution or suspension. In the preferred practice of this invention, the solvent comprises about 23% by weight of the resin solvent admixture. The amount of solvent in the resin component and polyisocyanate component (and the types of solvent used with the resin component) may be varied to provide on admixture a binder which includes resin, polyisocyanate and selected solvent in the amount of 10% to 40% and preferably about 23% by weight of the binder admixture. The polyisocyanate is employed in the amount of about 80% to 125% by weight of the resin. Usually the resin and polyisocyanate are employed in equal amounts by weight.

In another preferred embodiment the binder may include a diluent or solvent different from the selected solvent. The solvent chosen for such use will of course be one which is compatible with the resin to provide stable compositions. Typical suitable solvents are aromatic solvents, cyclohexanone, isophorone and 2-(2-butoxy-ethoxy) ethyl acetate. In this case the isocyanate component would be dissolved in the selected solvent.

In the preparation of cores suitable for foundry use, the binder (which comprises the resin, polyisocyanate, solvent, and sometimes a catalyst) is employed in an amount in the range of 1% to 5% by weight of the foundry sand, and generally in the amount of about 2% by weight of the sand. The binder and sand are mixed in a muller or other device suitable for evenly distributing the binder on the sand in keeping with the requirements of the specific processes by which the cores are made. These processes are conventional and form no part of the instant invention. As before described, a catalyst is generally employed and its selection will depend upon the specific process by which the core is made. In the cold box process, the catalyst is generally an amine such as triethylamine, the sand is coated with binder in the absence of catalyst, and placed in a core box. The amine catalyst is vaporized into a gaseous substance, such as carbon dioxide, and blown through the core box to catalyze the reaction of the binder. In a foundry process such as the no-bake process or rapid no-bake process, either liquid amine catalysts or metal catalysts may be employed. Metal catalysts such as lead naphthenate or dibutyl tin dilaurate are preferred.

Generally such catalysts are used in amounts from 0.0001 to 0.04 by weight of the resin. The catalysis of resin polyisocyanate binder systems in the foundry art is well known. The amount and type of catalyst is adapted to provide the desired speed of reaction in accordance with the parameters of the specified process in which the binder is employed.

Catalysts suitable for curing the binder of the present invention are well known in the art and form no part of this invention.

The invention will be better understood with reference to the following examples. It is to be understood, however, that these examples are intended only to illustrate the invention, and it is not intended that the invention be limited thereby.

EXAMPLE I

This example illustrates the use of polyisocyanate-selected solvent component together with a high water content phenol-formaldehyde resin. The resin is a resole prepared from 1 mole of phenol and 1.3 moles of paraformaldehyde (100% basis). The paraformaldehyde was the usual commercial grade having 91% formaldehyde content. The reaction proceeded at 75 – 85° C in the presence of sodium hydroxide catalyst. The resin was cooled and neutralized with acetic acid to pH 6.5. The resin had a viscosity of 350 centipoises, a free phenol content of 13.6% and a water content of 10%. A silane was added in the amount of 0.25%. The resin was made up of 65.6% resin in isophorone and designated resin component No. 1, and as 65.6% resin in 2-(2-butoxyethoxy)-ethyl acetate and designated resin component No. 2.

The resin components were employed with polyisocyanate components in a no-bake process using Portage 430 sand, 1% resin component and 1% polyisocyanate component (based on sand weight) and 3% Kemamine catalyst (based on resin weight). The polyisocyanate used was polydiphenylmethane diisocyanate, sold as Mondur MR by Mobay Chemical Corporation. Kemamine is a dimethyl alkylamine wherein the alkyl group is derived from soya oil. The results were as shown in Table 1. Surprisingly, a core prepared in the presence of the solvent of the above formula possessed a far higher tensile strength — about twice as high — as did a core prepared in the presence of a conventional aromatic solvent.

Table 1

| Test | Resin Formulation | Isocyanate Component | Sand Temp °F | Draw Time Min | Hardness (Dietert) | 1 hr Tensile Strength psi |
|---|---|---|---|---|---|---|
| 1 | Resin Component #1 | 65.6% Mondur MR in Butylal | 72 | 3 | 62 | 72, 57 |
| 2 | Resin component #1 | 65.6% Mondur MR in Butylal | 72 | 3 | 62 | 55, 63 |
| 3 | Resin component #1 | 65.6% Mondur MR in Butylal | 67 | 1.25 | 76 | 70, 55, 65 |
| 4 | Resin component #1 | 65.6% Mondur MR in Butylal | 66 | 2.5 | 70 | 83, 49, 57 |
| 5 | Resin component #1 | 65.6% Mondur MR in Aromatic Solvent | 68 | 2.75 | 79 | 20, 18, 33 |
| 6 | Resin component #1 | 65.6% Mondur MR in Aromatic Solvent | 68 | 2.5 | Collapsed Specimen | 27, 17, 27 |
| 7 | Resin component #1 | 65.6% Mondur MR in Aromatic Solvent | 64 | 2.0 | 90 | 27, 27, 27 |
| 8 | Resin component #1 | 65.6% Mondur MR in Aromatic Solvent | 65 | 4.0 | 72 | 30, 30, 45 |
| 9 | Resin component #2 | 65.6% Mondur MR in Butylal | 63 | 4.0 |  | 83, 65, 65 |
| 10 | Resin component #2 | 65.6% Mondur MR in Butylal | 64 | 3.5 |  | 50, 55, 57 |
| 11 | Resin component #2 | 65.6% Mondur MR in Aromatic Solvent | 63 | 4.0 |  | 30, 30, 45 |

EXAMPLE II

A resin component was prepared by reacting the ingredients listed in Table 2:

Table 1

| Bisphenol A | 4.1 g. |
|---|---|
| Tetraethylene glycol | 2.2 g. |
| Isophorone | 5.5 g. |

The resulting product was mixed with Mondur MR polydiphenylmethane diisocyanate 10 g. dissolved in 2 g. of isophorone to form the binder composition. For comparison, a similar mixture was prepared but in this case the Mondur MR was dissolved in 4.8 g. of butylal instead of isophorone. The binder (isocyanate component and resin component) was applied to 1200 g. of Portage sand in a muller and was tested in a cold box system, the test core being gassed with triethylamine vapor. The results obtained are given in Table 3:

Table 3

| Test | Polyisocyanate Component | Strip Tensile Strength |
|---|---|---|
| 1 | 10 g. Mondur MR + 2 g. Isophorone | 99, 94, 102 |
| 2 | 9.2 g. Mondur MR + 4.9 g. Butylal | 183, 237, 190 |

The advantage of the use of butylal, the selected solvent of this invention, is evident and surprising.

We claim:

1. A foundry core mix adapted to being cured by a catalyst comprising a foundry aggregate and about 1% to 5% by weight of the aggregate of a binder comprising in admixture:
   a. a curable resin base of the group consisting of epoxy resins, polyester resins, and aqueous phenol-formaldehyde resins,
   b. a reactive liquid polyisocyanate in the amount of 80% to 125% by weight of the resin base, and;
   c. a solvent of the formula

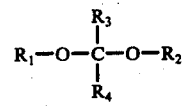

in which $R_1$ and $R_2$ are the same or different hydrocarbon radicals of three to six carbon atoms and $R_3$ and $R_4$ are the same or different hydrogen, methyl, ethyl or phenyl radicals.

2. The foundry mix of claim 1 in which said solvent is present in the amount of about 10% to 40% by weight of the binder.

3. The foundry mix of claim 2 in which $R_3$ and $R_4$ are hydrogen.

4. The foundry mix of claim 3 in which $R_1$ and $R_2$ are both butyl.

5. The foundry mix of claim 4 in which the resin is a phenol-formaldehyde resole.

6. The foundry mix of claim 1 wherein the resin is an epoxy resin.

7. The foundry mix of claim 1 wherein the resin is a polyester resin.

8. The foundry mix of claim 7 wherein said polyester is an alkyd resin.

* * * * *

UNITED STATES PATENT AND TRADEMARK OFFICE
CERTIFICATE OF CORRECTION

PATENT NO. : 4,051,092
DATED : September 27, 1977
INVENTOR(S) : Melville J. Holik and John F. Kraemer It is certified that error appears in the above-identified patent and that said Letters Patent are hereby corrected as shown below:

Column 1, line 24, "nobake" should read -- no-bake --

Column 3, lines 21-22, "triisocyante" should read -- triisocyanate --

Column 3, line 25, "availabe" should read -- available --

Column 3, line 46, "ypenthyloxymethane" should read -- ypentyloxymethane --

Column 5, line 37, "Table 1" should read -- Table 2 --

Column 5, line 58, Table 3, second column, "9.2 g. Mondur MR + 4.9 g." should read -- 9.2 g. Mondur MR + 4.8 g. --

Signed and Sealed this

Sixteenth Day of May 1978

[SEAL]

Attest:

RUTH C. MASON
Attesting Officer

LUTRELLE F. PARKER
Acting Commissioner of Patents and Trademarks